United States Patent
Harkcom et al.

(10) Patent No.: US 6,662,540 B1
(45) Date of Patent: Dec. 16, 2003

(54) METHOD AND APPARATUS FOR CONTROLLING PIVOTAL MOVEMENT OF THE TONGUE OF A HARVESTING MACHINE

(75) Inventors: Melanie W. Harkcom, New Holland, PA (US); Charles H. Hoffman, New Holland, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/234,279

(22) Filed: Sep. 4, 2002

(51) Int. Cl.[7] .................................................. A01B 73/00

(52) U.S. Cl. .......................................... 56/228; 56/15.5

(58) Field of Search .................................. 56/14.9, 15.1, 56/15.2, 15.5, 15.7, 365, 378, 228; 414/537, 556, 550, 703; 280/491.1, 491.3, 462, 463, 472, 473, 474; 172/679, 625, 245

(56) References Cited

U.S. PATENT DOCUMENTS

| | | | | |
|---|---|---|---|---|
| 3,962,853 A | * | 6/1976 | Schwalm et al. | 56/228 |
| 4,081,946 A | | 4/1978 | Ehrhart | 56/14.4 |
| 4,435,948 A | * | 3/1984 | Jennings | 56/228 |
| 4,558,560 A | | 12/1985 | Koch | 56/228 |
| 4,607,996 A | | 8/1986 | Koch | 414/537 |
| 5,642,607 A | * | 7/1997 | Stephenson et al. | 56/15.1 |
| 5,975,829 A | | 11/1999 | Walters et al. | 414/537 |
| 6,260,629 B1 | * | 7/2001 | Toth | 172/282 |
| 6,273,449 B1 | | 8/2001 | Harkcom et al. | 280/491.3 |
| 6,360,516 B1 | | 3/2002 | Harkcom et al. | 56/15.5 |

* cited by examiner

*Primary Examiner*—Robert E. Pezzuto
(74) *Attorney, Agent, or Firm*—John William Stader; Collin A. Webb; Brant T. Maurer

(57) ABSTRACT

A pivot tongue crop harvester, having an hydraulic system to selectively swing the pivot tongue about a pivot point on the harvesting mechanism, including a selector valve to cut off flow of hydraulic fluid to the tongue swing cylinder during loading of the harvester onto a transporter is the driveline of the harvester has not been disconnected.

20 Claims, 4 Drawing Sheets

_US 6,662,540 B1_

METHOD AND APPARATUS FOR CONTROLLING PIVOTAL MOVEMENT OF THE TONGUE OF A HARVESTING MACHINE

FIELD OF THE INVENTION

The instant invention relates generally to the transport of crop harvesting implements, and more particularly to a method and apparatus for preventing damage to either the transporter or implement due to improper conversion into transport position through utilization of an automatic cutoff valve in the hydraulic fluid system.

BACKGROUND OF THE INVENTION

A mower-conditioner is used for the harvesting and processing of hay and other crops. The harvester is typically towed by a tractor and powered by either a hydraulic pump or the PTO of the tractor. A pivoting tongue connects the harvester to the tractor during operation and transportation.

The cutting means of the harvester consist of either a sickle bar or rotary disc mower that may be accompanied by a conditioner to remove moisture from the harvested hay or crop material. If conditioned crops are desired, the crops are passed through a pair of rubber covered conditioning rolls or through a set of metal flails. The means of cutting and conditioning are well known and well described in the prior art. The processed crop is left to dry on the field and is usually further processed by a baling mechanism.

Generally, harvesting equipment, particularly hay harvesting equipment, has been designed and manufactured with a transverse width that would permit transport thereof over the highway and through farm gates. Although the hay harvesting machines commonly referred to as pivot tongue windrowers, such as those shown in U.S. Pat. No. 4,081,946, granted in 1978 to Philip J. Ehrhart, were generally wider in a transverse direction than previous pull-type hay harvesting machines, the centrally mounted pivoted drawbar permitted towing of the harvester directly behind the tractor in a centrally located position and, therefore, transport of the harvester in a normal operational orientation was possible.

The width of the mowers has been increased over the years in order to improve productivity and the efficiency of harvesting hay or crop material. This increase in mower width has necessitated an alteration in the means of mower transport, as increasing transverse widths have prevented harvesters from being towed in an operable position behind the tractor over highways and through restrictive openings.

The development of the pivot tongue harvester with a laterally extendible drawbar, as disclosed in U.S. Pat. No. 4,558,560, permits the harvester to be mounted on a transporter and transported in a lateral orientation by utilizing the drawbar of the harvester as the hitch connection to the tractor. In order for transport, the implement is backed onto a transporter or trailer and the tongue is pivoted 90 degrees from the standard transport position. A trans When an implement is loaded on a transporter and the tongue of the implement is rotated to an endwise position and used to tow the implement and transporter, the driveline has to be disconnected. This step can easily be forgotten and damage can occur to the driveline and shielding on the implement.

In order to prevent damage to the driveline and shielding on the implement or damage to the transporter, there exists a need for an apparatus that prevents the tongue of the implement from rotation into the endwise transport position without first disconnecting the driveline between the tractor and the implement.

SUMMARY OF THE INVENTION

It is an object of this invention to provide an adaptation to the hydraulic system of an implement that prevents the tongue from pivoting beyond the operational limits of implement when it is being loaded onto a transporter.

It is another object of this invention to provide a hydraulic selector valve between the hydraulic source and the cylinder that controls the swing of the pivot tongue in order to block the flow of hydraulic fluid to the swing cylinder when the limits of the desired swing arc are reached.

It is another object of this invention to provide a harvester with a pivot tongue that cannot swing into a transport position on a transporter without the prior detachment of the driveline and steering link.

It is another object of this invention to provide a method and apparatus for preventing damage to the driveline, steering link, and gearbox that does not rely upon complex or expensive to produce components.

It is another broad object of this invention to provide an improved implement hydraulic system that cooperates better with a transporter than those heretofore known.

It is a still further object of this invention to provide an agricultural harvesting implement that works with a lateral transporter for carrying the implement in a transverse orientation that is durable in construction, inexpensive of manufacture, low in maintenance, facile in assemblage, and simple and effective in use.

These and other objects, features, and advantages are accomplished according to the instant invention by providing a pivot tongue crop harvester having an hydraulic system to selectively swing the pivot tongue about a pivot point on the harvesting mechanism, including a selector valve to cut off flow of hydraulic fluid to the tongue swing cylinder during loading of the harvester onto a transporter if the driveline of the harvester has not been disconnected.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

The terms "left" and "right", "up" or "upwardly" and "down" or "downwardly" are used herein for clarity and ease of description only. They refer to directions as relate to the machine, setting on the ground, facing in the normal direction of travel while in operation.

Figure 1:
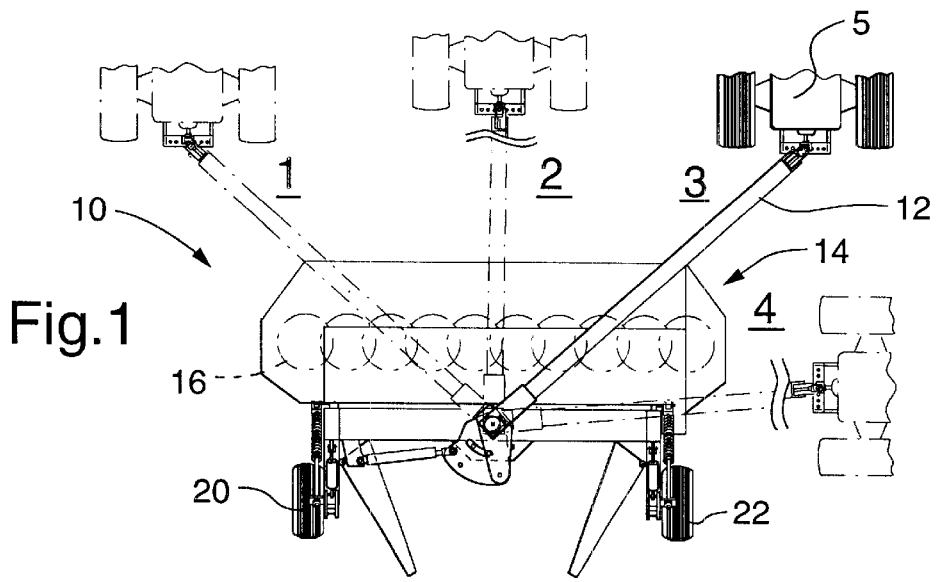
FIG. 1 is a top plan view of the crop harvesting implement of the type to be transported, showing the rear end of a tractor connected thereto, the operative tongue positions and the relative transport positions of the tractor and implement (without the transporter)

Referring now to FIG. 1 for a more detailed description, a pivot tongue harvester 10 is shown. As discussed above in the BACKGROUND OF THE INVENTION, this is a well-known hay harvester and includes, in pertinent part, a centrally mounted pivot tongue 12 connected to tractor 5, a header 14 with a cutterbar 16 (shown in phantom), and support wheels 20 and 22. The harvester may be operated in any of the three positions shown in FIG. 1 as 1, 2 and 3. For purposes of clarity, FIG. 1 also shows the tractor in the lateral position 4, which is the position it would be in for pulling the implement after loading onto the transporter. As can be seen, the operable positions when harvesting are anywhere within approximately 45° of either side of the tongue when it is parallel to the line of travel of the tractor. Therefore, the pivoting range for the tongue is from approximately 45° to the left of the centerline, as viewed in this figure, to the transport position in which the tongue is substantially parallel to the header.

Figure 2:
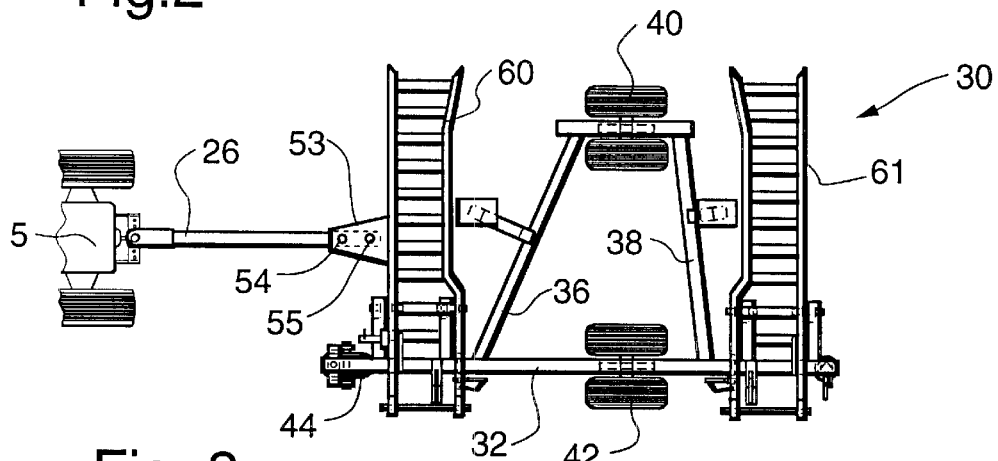
FIG. 2 is a top plan view of the transporter and a tractor attached for empty towing of the transporter.

Since the drawbar, or tongue, of the implement is used to pull the load during the transport mode, some other arrangement has to be made for empty movement. FIG. 2 shows the transporter 30 ready for movement without a loaded implement. Forward is the direction of travel of the transporter when loaded, which would be to the right in FIG. 2. Reverse is the opposite direction, or the direction that the transporter is moved when unloaded. A secondary tongue 26 attaches to a yoke 53 on the rearmost ramp 60 by pins or bolts 54 and 55. Note that when moving the transporter without the implement, secondary tongue 26 is attached such that the direction of travel is the opposite of that when loaded.

Referring further to FIG. 2, the basic transporter 30 can be seen to comprise a main frame that includes a longitudinal box beam 32, a shorter longitudinal box beam 34 held in spaced apart relation to beam 32 by two additional generally transverse box beams 36 and 38. The main frame is supported for movement by wheel sets 40 and 42 (in both cases, only one reference number is used to designate the wheel pair), though single wheels would also provide the adequate support, however, perhaps without the desired load carrying capabilities, especially in wet, muddy field conditions often encountered on the farm. As can be seen more clearly in other figures, a caster wheel 44 is attached to beam 32 at the rear end thereof for additional support during loading and unloading and for assistance in moving the implement tongue 12 from the loading to the transport position. Caster wheel 44 is in common usage and standard construction and style.

A transporter quite suitable for use with an implement incorporating the invention herein described and claimed is shown in co-pending U.S. patent application Ser. No. 09/909,657, filed on Jul. 20, 2001, and entitled "Ramp Lock for Implement Transporter". That application is hereby incorporated herein by reference in its entirety. As described in that application, a pair of ramps, 60 and 61, are pivotably attached to the main frame. Attached to the transverse beams 36 and 38, and extending above the level of the raised ramps, are two header supports and generally flat support plates. When the header 14 of implement 10 is lowered for transport, as will also be discussed further below, the header rests on these support plates.

Figure 3:
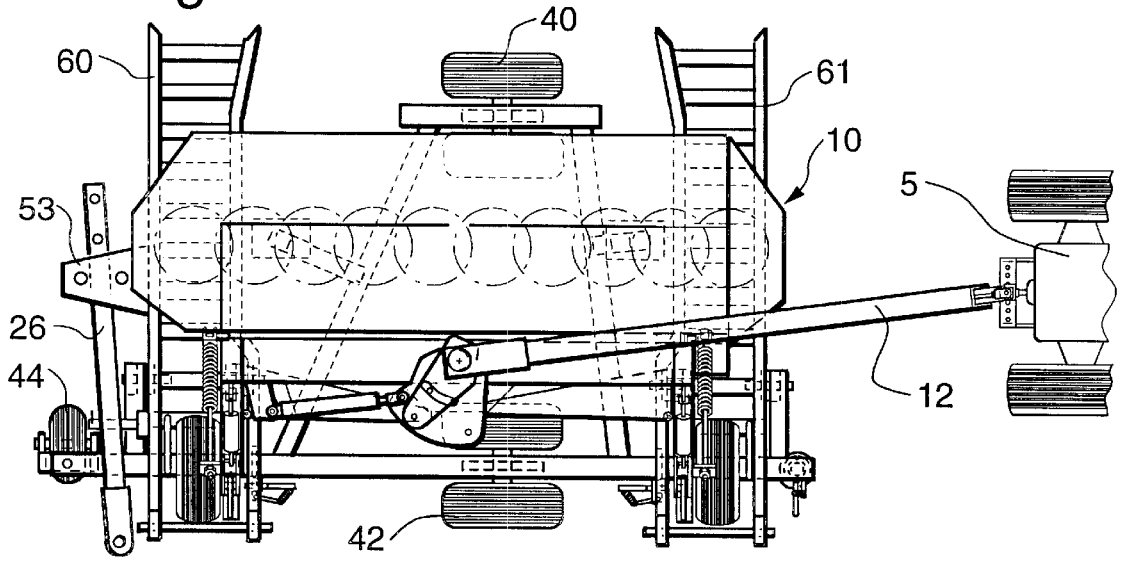
FIG. 3 is a top plan view of the crop harvesting implement as it would appear loaded onto the transporter, the tongue rotated approximately 85 degrees to the transport position and connected to the rear end of a tractor.

Referring to FIG. 3, the pivot tongue harvester 10 is shown in transport position on transporter 30. The steering link and driveline have been detached (not shown) and the centrally mounted pivot tongue 12 has been rotated fully to the side (when viewed from above). The pivot tongue is now the device used to pull the load and the secondary tongue 26 has been stowed away.

Figure 4:
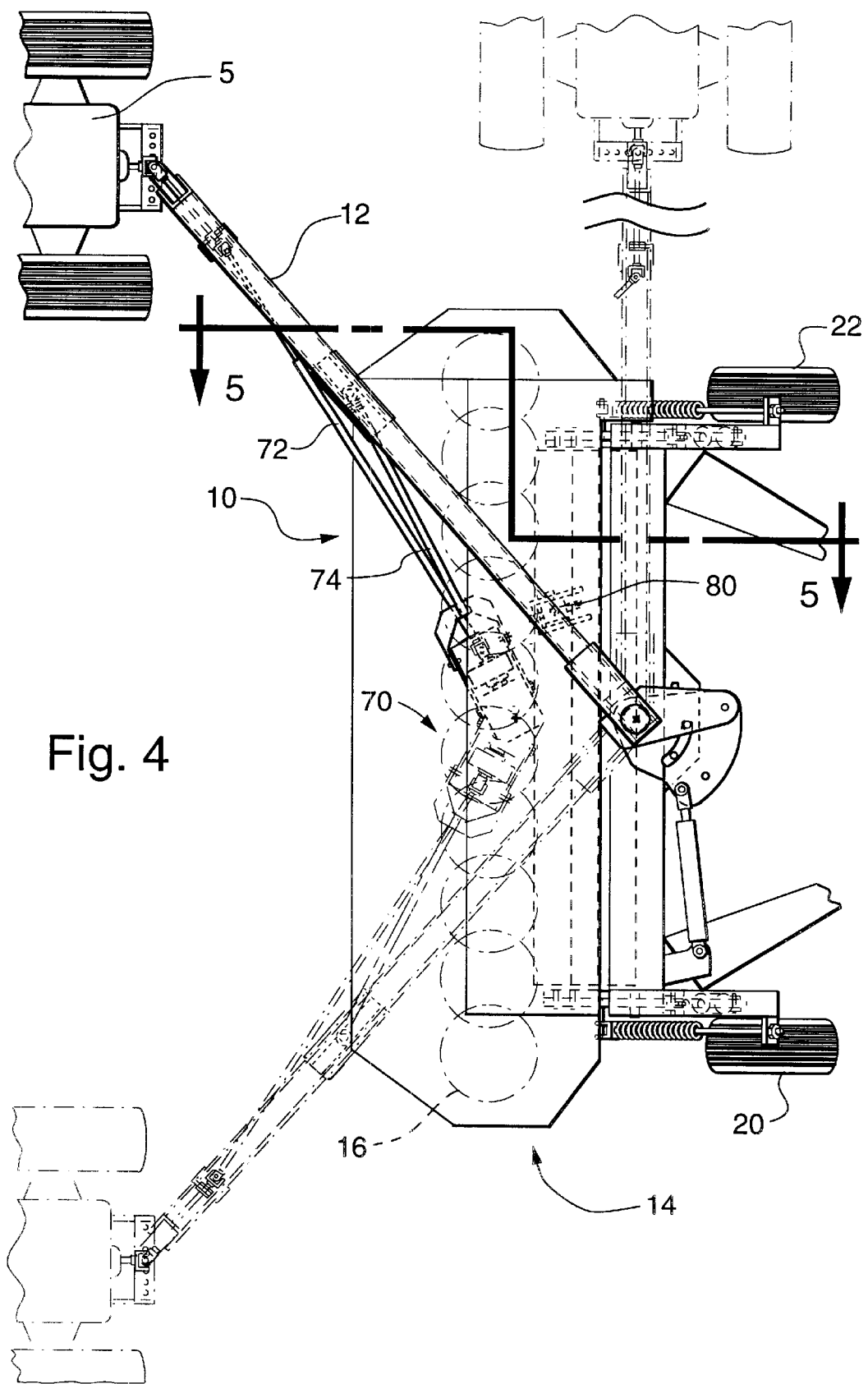
FIG. 4 is a top plan view of the crop harvesting implement connected to a tractor and featuring the steering link and tongue in the operable positions to the left and right as well as the transport position (in phantom)

Referring now to FIG. 4, the harvester is shown in operational mode connected to the tractor by the pivot tongue. The gearbox 70 is shown pivotably mounted on the header attached to the pivot tongue 12 by the driveline 72 and steering link 74. During operation, the driveline 72 transfers power from the tractor PTO to the gearbox 70. The gearbox is responsible for the action of the cutterbar and conditioner rolls (if present) as outlined in the BACKGROUND OF THE INVENTION. To ensure the proper operation of the gearbox, the gearbox and driveline must remain aligned while the pivot tongue swings or rotates. To accomplish this, a steering link is utilized to guide the gearbox pivot and maintain the proper angle between the driveline and gearbox.

Because the pivot tongue and driveline rotate on separate axes, their range of motion when joined is limited. Over-rotation of the pivot tongue can result in damage to the driveline, steering link, and gearbox. Position 4 represents the position of the pivot tongue when the harvester is in transport position. Position 3, however, shows the maximum permissible rotation of the steering link and driveline before damage occurs. In order to rotate the pivot tongue between positions 3 and 4, the steering link and driveline must be disconnected from the pivot tongue. As this step may be an easy one to forget, the instant invention acts as a precautionary measure to insure the safety of the driveline.

The hydraulic selector valve 80 is shown mounted to the header between the tongue pivot mount and the steering link mount. As the pivot tongue must rotate to the right to reach transport position (when viewed from above in the normal direction of operation), the hydraulic selector valve is positioned to the right of the pivot tongue mount in such a way as to make contact with the steering link when the driveline has reached its maximum allowable rotation. A more detailed description of the action of the hydraulic selector valve will follow below.

Figure 5:
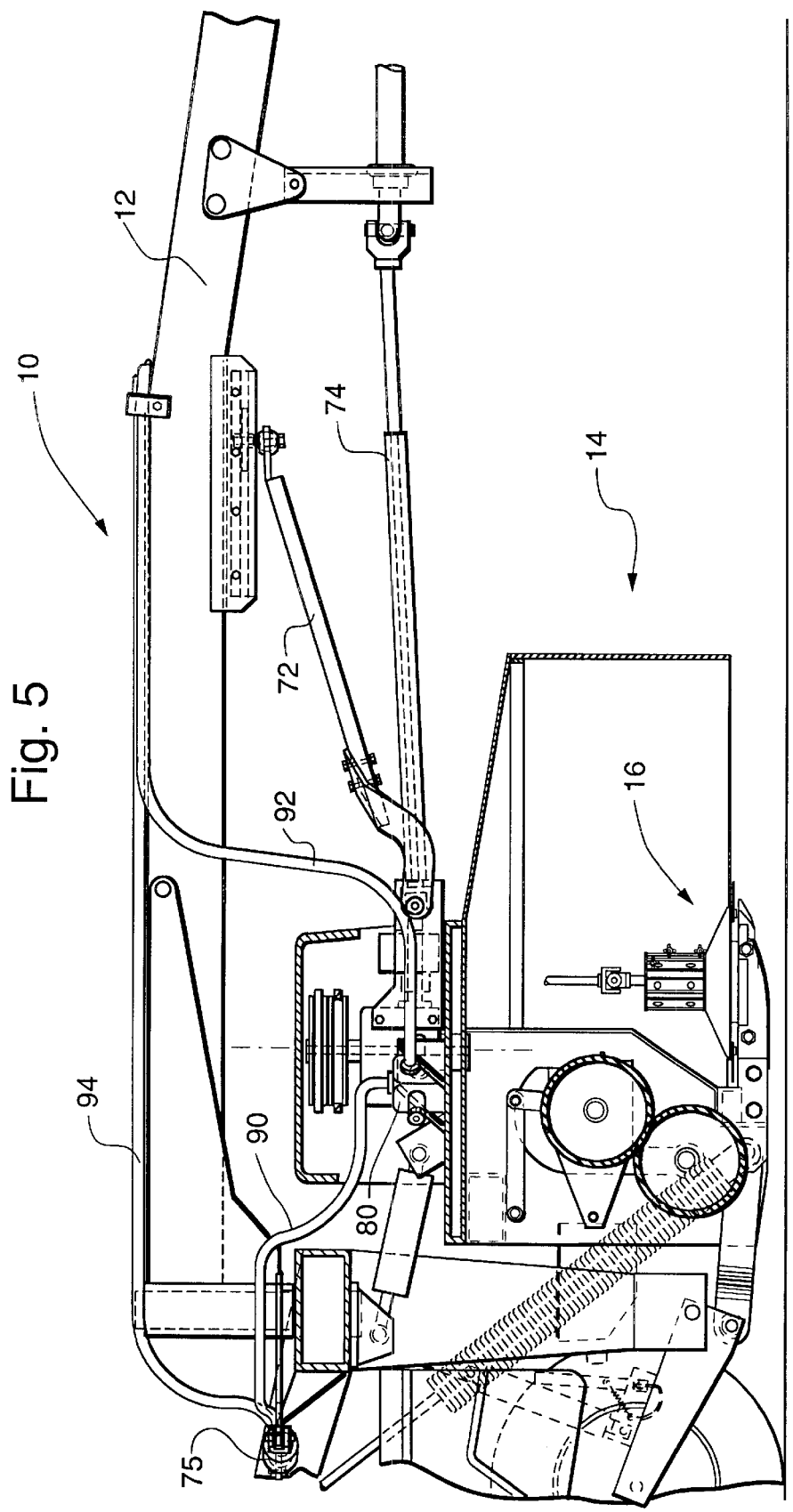
FIG. 5 is a side view of the crop harvesting implement showing the location of the instant invention to the right of the driveline with hydraulic links from the hydraulic selector valve to the tongue swing cylinder and to the tractor.

Referring now to FIG. 5, the harvester is shown from the right side in the normal direction of operation. The instant invention is clearly visible to the left of the driveline and in front of the gearbox. Hydraulic hoses 90, and 92 are shown entering and exiting the hydraulic selector valve, connecting the valve to the tractor (not shown) and the swing cylinder 75, and, including tube 94, connecting the swing cylinder 75 to the tractor 5. These hydraulic hoses are used to fuel the action of the swing cylinder and rotate the pivot tongue 12 through its normal range of motion. The mechanics of the swing cylinder are well known in the art, and the mechanism is well documented in U.S. Pat. No. 6,360,516.

Figure 6:
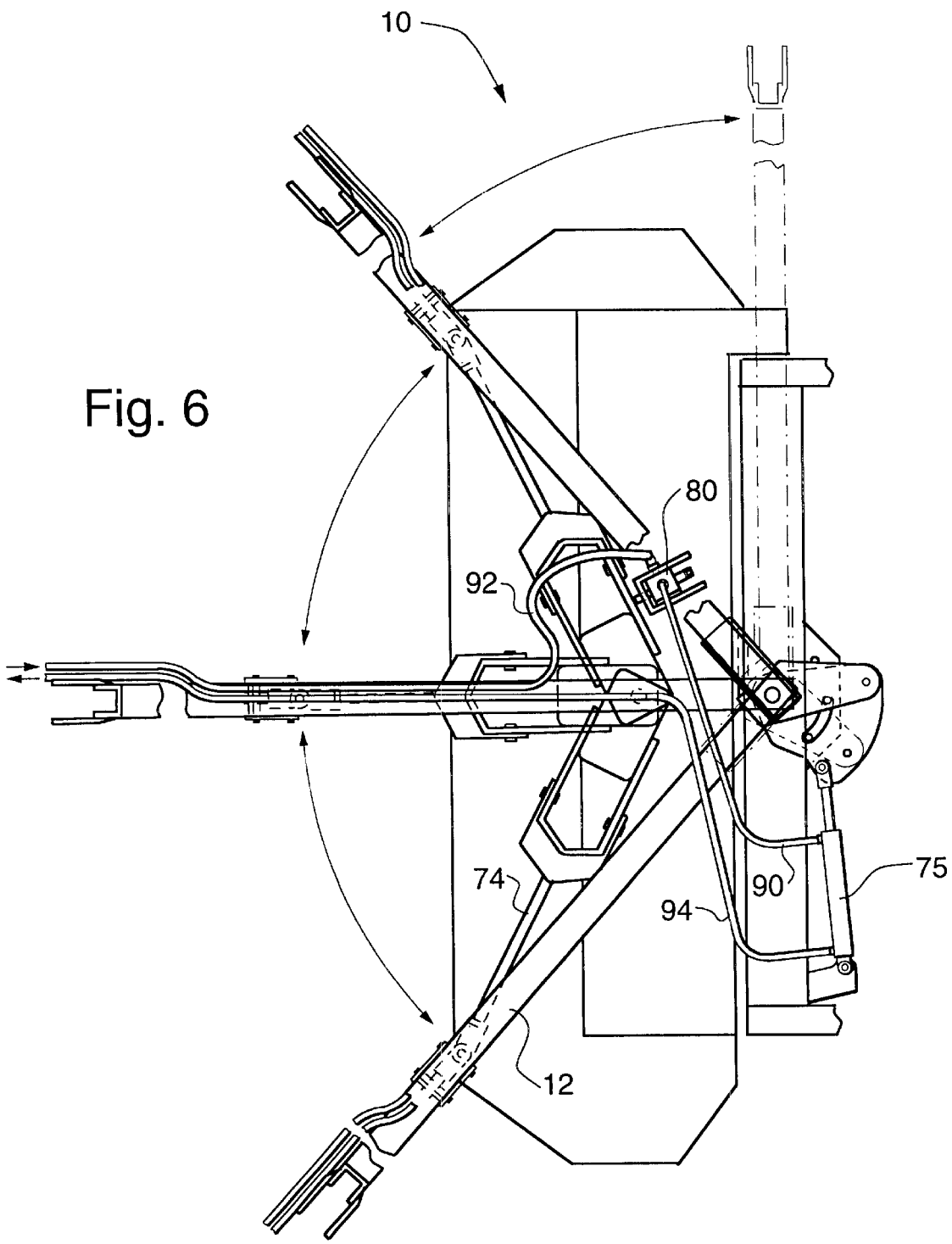
FIG. 6 is a view of the tongue and steering link from above, depicting the hydraulic selector valve serving as a break in the hydraulic line between the tractor and the swing cylinder.

Referring to FIG. 6, a close up of the pivot tongue is shown with hydraulic hoses or tubes running the length of the tongue, to and from the hydraulic selector valve and to and from the swing cylinder. As best seen in FIG. 6, a selector valve 80 was placed in the hydraulic circuit between the hydraulic source on the tractor and the tongue swing cylinder 75. If the operator forgets to disconnect the driveline and steering link from the tongue, the side of the steering link 74 will contact the valve and push it in, thus stopping the flow of hydraulic fluid to the swing cylinder 75. The tongue will not swing further without the hydraulic fluid and the operator must disconnect the driveline to continue.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. An agricultural crop harvester adapted to be pulled across a field of crop material by a tractor, the harvester comprising:

an elongate harvesting mechanism having a top side and a longitudinal axis generally perpendicular to the direction of travel of the harvester when in field operation, said harvesting mechanism supported for movement by at least one ground-engaging wheel;

an elongate tongue having a first end pivotably affixed to the top side of said harvesting mechanism and a second end remote therefrom, said second end of said tongue adapted to be affixed to a tractor and movable through a functional arc from an operating position to a transport position where said tongue is approximately parallel to said longitudinal axis;

a gearbox pivotably supported by said harvesting mechanism at a pivot point spaced from said first end of said tongue;

a telescoping driveline extending from said gearbox and supported by said tongue such that said driveline moves with said tongue and said gearbox pivots therewith;

an hydraulic system supported by said harvesting mechanism and including a swing cylinder operable to selectively pivot said tongue through said functional arc; and a selector valve in said hydraulic system to shut off the flow of hydraulic fluid to said swing cylinder; said selector valve fixed in a position to be actuated if said gearbox pivots to a preselected position within said functional arc, thereby preventing further pivoting of said tongue toward said transport position.

2. The crop harvester of claim 1, further including:

a steering link interconnecting said gearbox and said tongue.

3. The crop harvester of claim 2, wherein:

said gearbox and said steering link are selectively detachable from said tongue.

4. The crop harvester of claim 3, wherein:

said steering link is, when connected to said tongue, in a position to engage and activate said selector valve.

5. In an agricultural crop harvester including an elongate harvesting mechanism having a top side and a longitudinal axis generally perpendicular to the direction of travel of the harvester when in field operation, said harvesting mechanism supported for movement by at least one ground-engaging wheel;

an elongate tongue having a first end pivotably affixed to the top side of said harvesting mechanism and a second end remote therefrom, said second end of said tongue adapted to be affixed to a tractor and movable through a functional arc from an operating position to a transport position where said tongue is approximately parallel to said longitudinal axis;

a gearbox pivotably supported by said harvesting mechanism at a pivot point spaced from said first end of said tongue;

a telescoping driveline extending from said gearbox and supported by said tongue such that said driveline moves with said tongue and said gearbox pivots therewith; the improvement comprising:

an hydraulic system supported by said harvesting mechanism and including a swing cylinder operable to selectively pivot said tongue through said functional arc; and a selector valve in said hydraulic system to shut off the flow of hydraulic fluid to said swing cylinder; said selector valve fixed in a position to be actuated if said gearbox pivots to a preselected position within said functional arc, thereby preventing further pivoting of said tongue toward said transport position.

6. The crop harvester of claim 5, further including:

a steering link interconnecting said gearbox and said tongue.

7. The crop harvester of claim 6, wherein:

said gearbox and said steering link are selectively detachable from said tongue.

8. The crop harvester of claim 7, wherein:

said steering link is, when connected to said tongue, in a position to engage and activate said selector valve.

9. An hydraulic system for an agricultural crop harvester having an elongate harvesting mechanism having a top side and a longitudinal axis generally perpendicular to the direction of travel of the harvester when in field operation, said harvesting mechanism supported for movement by at least one ground-engaging wheel;

an elongate tongue having a first end pivotably affixed to the top side of said harvesting mechanism and a second end remote therefrom, said second end of said tongue adapted to be affixed to a tractor and movable through a functional arc from an operating position to a transport position where said tongue is approximately parallel to said longitudinal axis;

a gearbox pivotably supported by said harvesting mechanism at a pivot point spaced from said first end of said tongue;

a telescoping driveline extending from said gearbox and supported by said tongue such that said driveline moves with said tongue and said gearbox pivots therewith; said hydraulic system being supported by said harvesting mechanism and including a swing cylinder operable to selectively pivot said tongue through said functional arc; and a selector valve in said hydraulic system to shut off the flow of hydraulic fluid to said swing cylinder; said selector valve fixed in a position to be actuated if said gearbox pivots to a preselected position within said functional arc, thereby preventing further pivoting of said tongue toward said transport position.

10. The crop harvester of claim 9, further including:

a steering link interconnecting said gearbox and said tongue.

11. The crop harvester of claim 10, wherein:
said gearbox and said steering link are selectively detachable from said tongue.

12. The crop harvester of claim 11, wherein:
said steering link is, when connected to said tongue, in a position to engage and activate said selector valve.

13. In an hydraulic system for an agricultural crop harvester having an elongate harvesting mechanism having a top side and a longitudinal axis generally perpendicular to the direction of travel of the harvester when in field operation, said harvesting mechanism supported for movement by at least one ground-engaging wheel;
an elongate tongue having a first end pivotably affixed to the top side of said harvesting mechanism and a second end remote therefrom, said second end of said tongue adapted to be affixed to a tractor and movable through a functional arc from an operating position to a transport position where said tongue is approximately parallel to said longitudinal axis;
a gearbox pivotably supported by said harvesting mechanism at a pivot point spaced from said first end of said tongue;
a telescoping driveline extending from said gearbox and supported by said tongue such that said driveline moves with said tongue and said gearbox pivots therewith; said hydraulic system being supported by said harvesting mechanism and including a swing cylinder operable to selectively pivot said tongue through said functional arc; the improvement comprising:
a selector valve in said hydraulic system to shut off the flow of hydraulic fluid to said swing cylinder; said selector valve fixed in a position to be actuated if said gearbox pivots to a preselected position within said functional arc, thereby preventing further pivoting of said tongue toward said transport position.

14. The crop harvester of claim 13, further including:
a steering link interconnecting said gearbox and said tongue.

15. The crop harvester of claim 14, wherein:
said gearbox and said steering link are selectively detachable from said tongue.

16. The crop harvester of claim 15, wherein:
said steering link is, when connected to said tongue, in a position to engage and activate said selector valve.

17. A method for controlling pivotal movement of the tongue of an agricultural crop harvesting machine, said harvesting machine including an elongate harvesting mechanism having a top side and a longitudinal axis generally perpendicular to the direction of travel of the harvester when in field operation, said harvesting mechanism supported for movement by at least one ground-engaging wheel;
an elongate tongue having a first end pivotably affixed to the top side of said harvesting mechanism and a second end remote therefrom, said second end of said tongue adapted to be affixed to a tractor and movable through a functional arc from an operating position to a transport position where said tongue is approximately parallel to said longitudinal axis;
a gearbox pivotably supported by said harvesting mechanism at a pivot point spaced from said first end of said tongue;
a telescoping driveline extending from said gearbox and supported by said tongue such that said driveline moves with said tongue and said gearbox pivots therewith; comprising the steps of:
providing an hydraulic system supported by said harvesting mechanism and including a swing cylinder operable to selectively pivot said tongue through said functional arc; and
providing a selector valve in said hydraulic system to shut off the flow of hydraulic fluid to said swing cylinder; said selector valve fixed in a position to be actuated if said gearbox pivots to a preselected position within said functional arc, thereby preventing further pivoting of said tongue toward said transport position.

18. The crop harvester of claim 17, further including:
a steering link interconnecting said gearbox and said tongue.

19. The crop harvester of claim 18, wherein:
said gearbox and said steering link are selectively detachable from said tongue.

20. The crop harvester of claim 19, wherein:
said steering link is, when connected to said tongue, in a position to engage and activate said selector valve.

* * * * *